A. E. KRAUSE.
STRAINER.
APPLICATION FILED APR. 29, 1913.
1,111,470.
Patented Sept. 22, 1914.
Fig. 1.
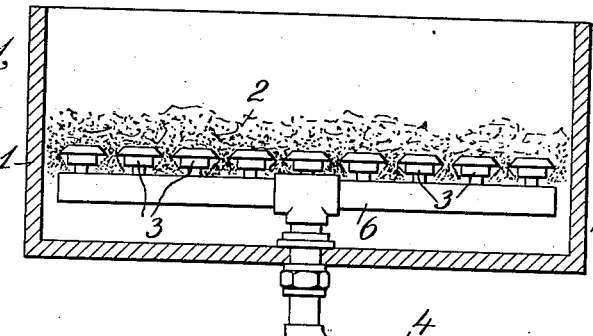
Fig. 9.
Fig. 2.
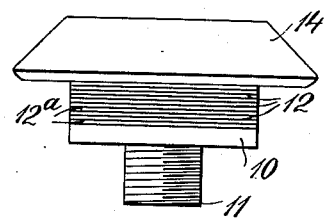
Fig. 3.
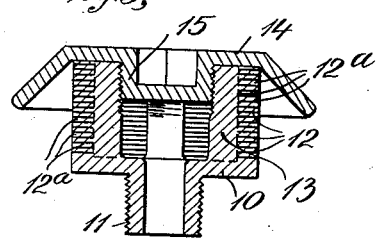
Fig. 4.
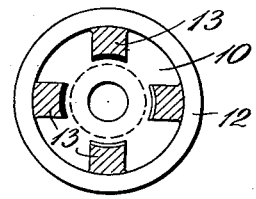
Fig. 5.
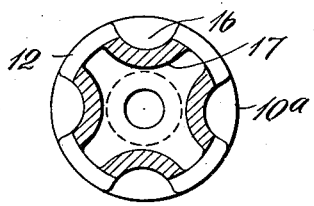
Fig. 6.
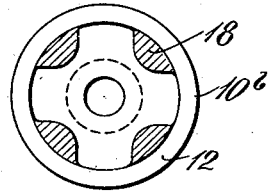
Fig. 7.
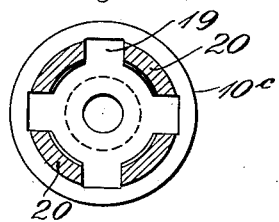
Fig. 8.
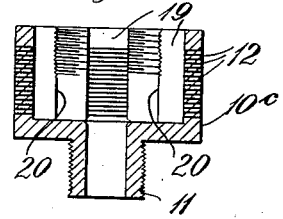
Witnesses:
Inventor
Arthur E. Krause
By his Attorneys

UNITED STATES PATENT OFFICE.

ARTHUR E. KRAUSE, OF JERSEY CITY, NEW JERSEY

STRAINER.

1,111,470.  Specification of Letters Patent.  Patented Sept. 22, 1914.

Application filed April 29, 1913. Serial No. 764,375.

*To all whom it may concern:*

Be it known that I, ARTHUR E. KRAUSE, a citizen of the United States of America, and a resident of Jersey City, in the county of Hudson and State of New Jersey, have invented certain new and useful Improvements in Strainers, of which the following is a specification.

My invention relates to improvements in strainers, particularly strainers which are intended to exclude solid matter, while permitting the free flow of water or other liquid which may carry solid matter with it.

The improved strainers herein described are particularly intended for use in connection with filters employing a layer of granular material (sand for example) as a filter bed. In such filters, strainers are used, not only to prevent the particles of the granular material of the filter bed from entering the clear water outlet pipe, but also for admitting wash water to the filter bed and distributing such wash water widely throughout such bed. In such filters, it has been the practice heretofore to employ a plurality of strainer heads, such heads being either connected to a series of communicating pipes under the filter bed, and leading to a common outlet pipe, or being mounted on a general discharge plate beneath the filter bed, there being beneath this discharge plate, a discharge chamber, with which the clear water discharge pipe communicates. When washing the filter bed of such a filter, the flow of water is reversed; *i. e.*, washing water is caused to flow through what is normally the clear water pipe into the strainers and thence into the filter bed, such washing water being discharged, in practice, into a suitable overflow pipe. By means of the washing water passing through the filter bed in the reverse of the direction of normal flow of water through such bed, the material of said bed is thoroughly agitated and washed, and thereby freed from impurities taken up during the filtering operation.

The strainer heads commonly used heretofore consist of metallic nozzles having saw-cuts or slots forming orifices through which the water passes, such cuts being narrow enough to prevent the particles of filtering sand from entering or passing through them with the water. Other strainer heads have been provided with a number of small holes, in lieu of the saw-cuts or slots above mentioned. These former strainer heads have been so constructed, as a rule, that only a very limited area of straining surface is available, the number of straining slots or holes being therefore small, and the total cross-sectional area of such slots or holes being small, with the result that water passes through such slots or holes at a relatively high velocity; and since such water is apt to carry with it gritty matter, the slots or holes are gradually cut or widened by the action of such gritty matter, with the result that such strainers soon require renewal, or a coarser or less efficient grade of sand must be substituted. In some cases attempt has been made to reduce to a low limit the velocity of the water through the strainer holes, by the provision of a very large number of strainers; but this increases greatly the cost of the filtering apparatus.

By my invention I provide strainer heads which, even when of moderate size, have a very large effective straining area, containing a very large total cross section of straining holes or slots, the velocity of the water through which will be relatively low, therefor; and these strainer heads are of very simple construction, and moreover are provided with means for preventing the granular material of the filter bed from resting against such straining holes or slots. As a result, the cost of my strainer heads, per unit of straining area, is very much less than heretofore, the speed of the water passing through the slots is reduced, with consequent reduction of tendency of the strainers to clog, and since the granular material of the filter bed does not come into immediate contact with the straining surfaces, there is practically no action tending to cut out or enlarge the strainer slots.

My invention consists in the novel construction of the strainer heads, hereinafter described, and in the novel means provided for preventing the granular material of the filter bed from lying against the straining surfaces.

The objects of my invention are to improve straining heads, to increase, in proportion to the size of the straining heads, the total effective straining area, and the total area of straining holes or perforations, and to prevent the granular material of the filter bed from lying against the straining surface.

I will now proceed to describe my invention with reference to the accompanying drawings, and will then point out the novel features in claims.

Figure 1 shows a transverse section of a filter casing having within it a filter bed of granular material, and a plurality of straining heads, constructed in accordance with my invention, and mounted upon a suitable discharge pipe. Fig. 2 shows a side elevation of one form of my improved strainer head, Fig. 3 an axial section thereof, and Fig. 4 a transverse section thereof. Fig. 5 shows a transverse section of an alternative form of strainer. Fig. 6 shows a transverse section of a further alternative form of strainer. Fig. 7 shows a transverse section of still a further alternative form of strainer, and Fig. 8 shows an axial section thereof, and Fig. 9 is another vertical section illustrating a further alternative construction.

In Fig. 1, 1 designates the filter tank, 3 the strainer heads, 4 the clear water outlet pipe, and 6 a manifold connected to said pipe 4 and to which the strainer heads 3 are connected. The particular shape of the tank 1 and the particular arrangement of pipes 4 and 6 therein, and of the strainers on said pipe 6, forms no portion of my invention, and may be varied as desired. An arrangement of pipes 6 and strainer heads 3 thereon should be adopted, such that the strainers are spaced as evenly as possible over the entire cross sectional area of the tank, and with the strainers at suitable distances from one another. 2 designates the granular material of the filter bed.

Referring first to Figs. 2, 3 and 4, illustrating one form of my improved strainer, the strainer there shown comprises a hollow body 10 having a suitable flow connection 11, the main portion of said body 10 provided with ribs 13 projecting inwardly from the cylindrical peripheral wall of the strainer; and in this cylindrical peripheral wall are a number of slots 12 (with advantage they may be saw-cuts) preferably extending completely around the strainer body and completely through the peripheral wall of that strainer, but not extending completely through the ribs 13. The metal partitions 12ª between these slots 12 are therefore supported by the ribs 13. The ribs 13 are screw threaded internally, as shown particularly in Figs. 3 and 4, and the strainer head is closed at the top by a cap or hood 14 having a central boss 15 screw threaded externally and adapted to engage and coact with the screw threads provided on the inner surfaces of the ribs 13.

Practically the entire peripheral surfaces of the sprinkler body 10 constitute straining surface, the total area of straining orifice being therefore very large as compared with the size of the strainer. As indicated particularly in Fig. 1, the granular material of the filter bed is prevented from lying against the straining surface of the strainer heads by the hoods 14; for these hoods project well out from the body of the strainer head so that the natural angle-of-repose hillocks of the filter bed, beneath these hoods 14, clear the straining surface of the strainers. In consequence of the fact that the natural angle of repose hillocks of the filtering material clear the straining surface of the strainers, a free space exists around each strainer, these spaces during the normal operation of the filter, containing only clear water which has filtered through the sand. Since the main body of the sand does not contact with the straining surfaces of the strainers, there is practically no tendency for the water to carry sand into the straining slots 12, and therefore there is practically no tendency either to clog these slots or to cut them out.

In the alternative construction shown in Fig. 5, the strainer body, there designated by numeral 10ª is provided with a plurality of external grooves 16 and corresponding inwardly projecting curved portions 17; and the saw cuts or slots 12 extend completely through the main peripheral wall of the strainer, but not through these curved inner projections 17. This construction is the substantial equivalent of the construction shown in Figs. 3 and 4, in so far as the formation of the body portion of the strainer head is concerned, except that the construction of Fig. 5 does not provide quite so large a proportion of the effective straining surface in proportion to the size of the strainer head.

The construction shown in Fig. 6 is likewise substantially equivalent to that shown in Figs. 3 and 4, the main portion of the body of the strainer head, here designated by numeral 10ᵇ, being provided with curved ribs 18; and the slots 12 do not penetrate through these ribs.

In the construction shown in Figs. 7 and 8, the main body portion of the strainer, here designated by numeral 10ᶜ is provided with interior slots 19, the portions of metal 20 between these slots corresponding substantially to the ribs 13 of Figs. 3 and 4 and to the ribs 17 and 18 of Fig. 5.

The construction shown in Fig. 9 comprises a base 10″ having a flow connection 11, and having ribs 13′ projecting upwardly from the base, as in Fig. 3, and screw threaded internally. The perforate wall of the strainer is formed by a series of washers 21, spaced apart one from another by means of bosses 21′, these washers being held in place by the end piece 14, screw connected to the ribs 13′, as in Fig. 3. This construction and other constructions embodying rings separate from the base and head and centered by ribs such as ribs 13′, form the subject matter of a separate application filed February 19, 1914, Sr. No. 819,788.

My improved strainer head is used in the same way that the straining heads formerly existing have been used; but owing to the total large effective area of straining orifices provided, the velocity of the water passing through these orifices is slow; the advantages of which have been set forth heretofore.

What I claim is:—

1. A strainer such as described, comprising a hollow body having a flow connection and having inwardly projecting portions and perforations, between such inwardly projecting portions, extending from the outer surface of said body inward, the said inward projections being screw threaded internally and an end piece having a correspondingly screw threaded portion engaging the threads of said projections, said end piece closing the end of said body.

2. A strainer such as described, comprising a hollow body having a flow connection and having integral inwardly projecting portions and perforations between said inwardly projecting portions extending from the outer surface of said body inward, and a detachable end piece screw threaded to the said hollow body, and closing the end of the same.

In testimony whereof I have signed this specification in the presence of two subscribing witnesses.

ARTHUR E. KRAUSE.

Witnesses:
 H. M. MARBLE,
 E. S. ROSS.